United States Patent
Richter et al.

(10) Patent No.: US 7,303,203 B1
(45) Date of Patent: Dec. 4, 2007

(54) ERGONOMIC WHEELCHAIR HAND RIM

(76) Inventors: William Mark Richter, 3301 Cobble St., Nashville, TN (US) 37211; Jamie Hameed Noon, 941 Calle Mejia, Suite 317, Sante Fe, NM (US) 87501; Peter William Axelson, 1617 Water St., Suite B, Minden, NV (US) 89423

( * ) Notice: Subject to any disclaimer, the term of this patent is extended or adjusted under 35 U.S.C. 154(b) by 163 days.

(21) Appl. No.: 10/861,016

(22) Filed: Jun. 4, 2004

(51) Int. Cl.
    *B62M 1/14* (2006.01)
(52) U.S. Cl. .................. 280/250.1; 280/304.1
(58) Field of Classification Search ............ 280/250.1, 280/304.1; 74/557, 552; 16/430
    See application file for complete search history.

(56) References Cited

U.S. PATENT DOCUMENTS

| | | | |
|---|---|---|---|
| 2,938,738 A | 5/1960 | La Rue | |
| 4,366,964 A | 1/1983 | Farey | |
| 4,687,218 A | 8/1987 | Okamoto | |
| 4,770,432 A * | 9/1988 | Wagner | 280/250.1 |
| 5,028,065 A * | 7/1991 | Danecker | 280/250.1 |
| 5,145,197 A * | 9/1992 | Gatti | 280/304.1 |
| 5,927,739 A | 7/1999 | Evling | |
| 6,120,047 A | 9/2000 | Axelson | |
| 6,241,268 B1 | 6/2001 | Niklasson | |
| 6,241,321 B1 * | 6/2001 | Gagnon | 301/64.704 |
| 6,276,705 B1 | 8/2001 | Baldwin | |
| 6,966,569 B2 * | 11/2005 | Miyoshi | 280/250.1 |
| 2004/0103745 A1 * | 6/2004 | Willems et al. | 74/552 |

FOREIGN PATENT DOCUMENTS

| | | |
|---|---|---|
| DE | 3834696 | 4/1990 |
| JP | 7304302 | 11/1995 |
| JP | 9193602 | 7/1997 |

OTHER PUBLICATIONS

Boninger,ML, Cooper,RA, Baldwin,MA, Shimada,SD, and Koontz,AM "Wheelchair pushrim kinetics: body weight and median nerve function" Arch Phys Med Rehabil v80, p. 910-5 (1999).

Boninger,ML, Towers,JD, Cooper,RA, Dicianno,BE, and Munin,MC "Shoulder imaging abnormalities in individuals with paraplegia" J Rehabil Res Dev v38, p. 401-8 (2001).

Dalyan,M, Cardenas,DD, and Gerard,B "Upper extremity pain after spinal cord injury" Spinal Cord v37, p. 191-5 (1999) (abstract).

Richter,WM and Axelson,PW "Effect of a vinyl-coated handrim on wheelchair use" Proceedings of the American Society of Biomechanics Conference 2003 (CD-ROM).

* cited by examiner

*Primary Examiner*—Anne Marie Boehler
(74) *Attorney, Agent, or Firm*—Dennis A. DeBoo (57) ABSTRACT

Wheelchair hand rim device comprised of a heat conducting tubular hand rim and a continuous circumferential elastomeric interface that has a cross-sectional contour comprised of an outwardly extending horizontal member having a proximal end coupled to an outboard side of a wheel rim transitioning into a downwardly depending member terminating to a distal end coupled to an inboard upper portion of the tubular hand rim such that a majority of the tubular hand rim is exposed and devoid of the elastomeric interface. When braking, a user only uses the heat conducting tubular hand rim. When pushing, the user grips across both the tubular hand rim and the contoured elastomeric interface, which deforms to fit the hand, thereby providing improved comfort, frictional coupling, and impact attenuation.

14 Claims, 7 Drawing Sheets

ERGONOMIC WHEELCHAIR HAND RIM

STATEMENT REGARDING FEDERALLY SPONSORED RESEARCH OR DEVELOPMENT

This invention was developed with government support under SBIR Phase II Grant #2 R44 HD36533-02A2 by the National Center for Medical Rehabilitation Research in the National Institute of Child Health and Human Development at the National Institutes of Health. The government has certain rights in the invention.

FIELD OF THE INVENTION

This invention relates generally to wheelchair hand rims, and in particular, to an ergonomic wheelchair hand rim device and its method of use for a manual wheelchair.

BACKGROUND OF THE INVENTION

The manual wheelchair user controls the wheelchair with the hand rims. The wheelchair hand rim is typically a tubular hoop rigidly attached to the outside of the wheel. The hand rim, or handrim is known by several different names, including pushrim, handring, and handrail. Most hand rims in use today are made from steel or aluminum tubing that has been formed into a hoop with the ends welded together. The hand rim is mounted offset from the wheel to allow space for the user's hand to grip around it. Hand rims enable the wheelchair user to propel forward, turn, and brake. When propelling forward, the user reaches back, grips both hand rims tightly and pushes forward until his/her arms are almost fully extended. The user then releases the hand rims and begins preparing for the next push. Braking is accomplished by lightly gripping the hand rim as it slips through the user's hand. The tighter the grip, the greater the deceleration. The user generally maintains a fixed arm posture during braking.

Since wheelchair users rely on their upper extremities for mobility, pain and injuries to the upper extremity can severely impact function and independence. Unfortunately, there is a high occurrence of upper extremity repetitive stress injuries in the manual wheelchair user population. In a study of 130 manual wheelchair users, 59% were found to have upper extremity pain (Dalyan, et al, "Upper extremity pain after spinal cord injury" Spinal Cord vol. 37, 191-5, (1999)). Development of repetitive stress injuries has been associated with the loading applied to the hand rim during wheelchair propulsion. In particular, impact loading that occurs at the beginning of the push (Boninger, et al, "Wheelchair pushrim kinetics: body weight and median nerve function" Archives of Physical Medicine and Rehabilitation vol. 80, 910-5, (1999)), and peak loading on the hand rim (Boninger, et al, "Shoulder imaging abnormalities in individuals with paraplegia" Journal of Rehabilitation Research and Development vol. 38, 401-8, (2001)) have been identified as adverse conditions. Results of these studies suggest that reducing the demand on the user during propulsion may prevent or delay the development of injuries.

The typical hand rim in use today is functionally equivalent to that disclosed in U.S. Pat. No. 4,687,218 (issued to Okamoto on Aug. 18, 1987). In this design, the hand rim is attached to the wheel using machine screw fasteners passing through rigid standoffs spanning between the wheel and the hand rim. The rigid standoffs typically create a 0.75 inch clearance space between the wheel rim and the inside edge of the hand rim. As an alternative to the rigid standoffs, hand rims are also similarly attached to the wheel using welded metal tabs. Hand rim hoop diameters are normally proportional to the size of wheel onto which the hand rim is mounted. Hand rims commonly have a tubing diameter of about 0.75 inches. While generally suitable for propelling and maneuvering the wheelchair, conventional hand rims have some inherent disadvantages.

For example, the relatively small tubing diameter of the hand rim provides a very small gripping surface for the user. As such, the pressure against the user's hands on the hand rims is relatively high as the user pushes down on the hand rim with sufficient force to propel or otherwise maneuver the wheelchair. For many users, this level of pressure against the hands may be uncomfortable or even painful.

Hand rims are generally smooth with poor frictional properties. As a result, users need to grip hard to prevent slipping when pushing the wheelchair. These properties are due to the need to avoid abrading or burning of the hands during braking. Heat is generated as the hand rim slides through the hand during braking. Hand rims are typically made of a metal that has relatively high heat transfer characteristics, such as aluminum or steel, which serves to evenly distribute the heat over the entire hand rim. High friction coatings for hand rims, such as vinyl or foam are commercially available and have been found to significantly reduce physical demand for pushing (Richter and Axelson, "Effect of a vinyl-coated handrim on wheelchair use" Proceedings of the American Society of Biomechanics Conference 2003). Unfortunately, since the high friction coatings are heat insulators they result in a rapid local heat buildup at the hand/hand rim interface, making them unsuitable for sustained braking.

It is known, that there is an impact force as the hand strikes the hand rim in the beginning of the push. This impact force has been associated with the development of repetitive stress injuries among wheelchair users (Boninger, et al, "Wheelchair pushrim kinetics: body weight and median nerve function" Archives of Physical Medicine and Rehabilitation vol. 80, 910-5, (1999)).

There are numerous alternative hand rim designs. Some of the designs target improved manufacturability, while others attempt to improve hand rim ergonomics. There are several patented designs that integrate the wheel rim and the hand rim as a single extruded part, including U.S. Pat. No. 2,938,738 (issued to La Rue on May 31, 1960), JP Patent Number 7304302 (issued to Hashimoto on Nov. 22, 1995), and JP Patent Number 9193602 (issued to Hashimoto on Jul. 29, 1997). While these designs may serve to improve manufacturability, they do not address the ergonomic disadvantages of the standard hand rim.

DE Patent Number 3834696 (issued to Heinemann on Apr. 18, 1990) and U.S. Pat. No. 4,366,964 (issued to Farey on Jan. 1, 1983) describe hand rims with various cross-sectional shapes in an attempt to better match the shape of the hand during the grip. While improvements in grip comfort are important, these designs do not address the issues of low friction and impact loading during use.

Then, there is a collection of designs that detail methods to integrate a high friction surface into the hand rim without the associated problems of burning of the hands during braking. The general approach in all these designs is to provide a high friction material on the top surface of the hand rim and retain the high heat transfer metal on the bottom surface. In U.S. Pat. No. 5,927,739 (issued to Evling on Jul. 27, 1999), a standard hand rim is fitted with a rubber strip embedded along the top surface. In U.S. Pat. No. 6,241,268 (issued to Niklasson on Jul. 5, 2001), a contoured cross-sectional shape is coated with rubber along the top surface. U.S. Pat. No. 6,276,705 (issued to Baldwin on Aug. 21, 2001) is similar to U.S. Pat. No. 6,241,268 (issued to Niklasson on Jul. 5, 2001) except in this design, the shape of the hand rim is not contoured and a second hand rim of smaller hoop diameter is mounted concentrically within the primary hand rim hoop. While all of these designs attempt to improve frictional characteristics for pushing, they do not reduce impact loading during propulsion. In addition, all of the designs described above require the wheelchair user to alter his/her method of braking. Normally the user brakes by pinching across both the top and bottom surfaces of the hand rim. Since the top surfaces of the hand rims have a high friction heat insulating coating, the user cannot grip on the top surface when braking. Instead, the user must pull up on the bottom surface of the hand rim, which is more difficult to do and control than the standard braking technique.

U.S. Pat. No. 6,120,047 (issued to Axelson on Sep. 19, 2000) details an approach to addressing the ergonomic disadvantages of the standard hand rim wherein the rigid fasteners connecting the hand rim to the wheel are replaced with shock absorbing resilient fasteners and frictional characteristics are improved by introducing a dual hand rim system, where the inner hand rim is coated with a high friction material and the outer is left uncoated for traditional braking. While this design addresses the target ergonomic issues, there are some disadvantages, including: 1) in order to reduce the impact, which occurs locally between the hand and the hand rim, the entire hand rim must displace relative to the wheel rim, 2) the frictional benefits rely on the use of the dual-hand rim system, which requires two hand rims, equating to additional weight and cost, and 3) the shape of the handrim does not conform to the shape of the hand when gripped, resulting in peak pressure points on the hand during use.

Accordingly, there is a need for an ergonomic hand rim device for a manual wheelchair wheel, which overcomes or substantially alleviates the problems associated with prior designs.

BRIEF SUMMARY OF THE INVENTION

The present invention is distinguished over the known prior art in a multiplicity of ways. One embodiment of the invention provides an ergonomic hand rim device and its method of use for a manual wheelchair, comprised of an expanded and more ergonomically contoured grip surface to reduce peak pressure on the hand thereby improving comfort during use. The ergonomic hand rim device also provides improved frictional characteristics over a portion of the grip surface without compromising braking performance. Because of the increased frictional characteristics, the user does not need to grip as hard when pushing the wheelchair. Additionally, the ergonomic hand rim device reduces impact loading both locally between the hand and the hand rim as well as generally between the hand rim and a wheelchair wheel.

In one embodiment of the invention, the ergonomic hand rim device and its method of use is comprised of a contoured elastomeric interface, operatively coupled between an upper inboard portion of a tubular hand rim and a wheel rim of a wheelchair wheel for, among other things, replacing the rigid and discrete attachment mechanism commonly used to attach the standard hand rim to the wheelchair wheel rim. When pushing, the user grips across both the tubular hand rim and the contoured elastomeric interface. When braking for an extended period of time, the user only grips the tubular hand rim, thereby preventing burning of the hands. The contoured elastomeric interface provides benefits in hand rim shape, friction, and impact attenuation.

More particularly, and in one embodiment of the invention, the ergonomic hand rim device is comprised of a circular heat conducting tubular hand rim having a diameter less than a wheel rim of a wheelchair and spaced outboard of the wheel by a circumferential continuous elastomeric interface with a cross-sectional contour that includes an outwardly extending member having a generally convex shape, a concave upper surface immediately adjacent to the wheel rim, and a recessed lower surface and having a proximal end operatively coupled to an outboard side of the wheel rim and transitioning into and integrally formed with a downwardly depending member terminating to a distal end operatively coupled to an inboard upper portion of the tubular hand rim. A majority of the tubular hand rim is exposed and devoid of the elastomeric interface, such that under sustained braking only the heat conducting tubular hand rim is used. When pushing, the user grips across both the tubular hand rim and the contoured elastomeric interface, which generally matches the shape of the hand. The contoured elastomeric interface deforms under slight grip pressure to further improve fit with each specific hand shape, thereby improving comfort as well as frictional coupling to the hand during use. As a result, the user does not need to grip as hard when pushing. Impact loading is reduced locally between the hand and the hand rim as the elastomeric interface deforms under the hand during propulsion. Impact is further reduced generally between the hand rim and the wheel rim as the elastomeric interface deforms and the tubular hand rim displaces relative to the wheel rim.

Moreover, having thus summarized the invention, it should be apparent that numerous modifications and adaptations might be resorted to without departing from the scope and fair meaning of the present invention as set forth hereinbelow and by the claims.

DETAILED DESCRIPTION OF THE INVENTION

Considering the drawings, wherein like reference numerals denote like parts throughout the various drawing figures, reference numeral 10 is directed to an ergonomic hand rim device for a manual wheelchair.

Figure 1:
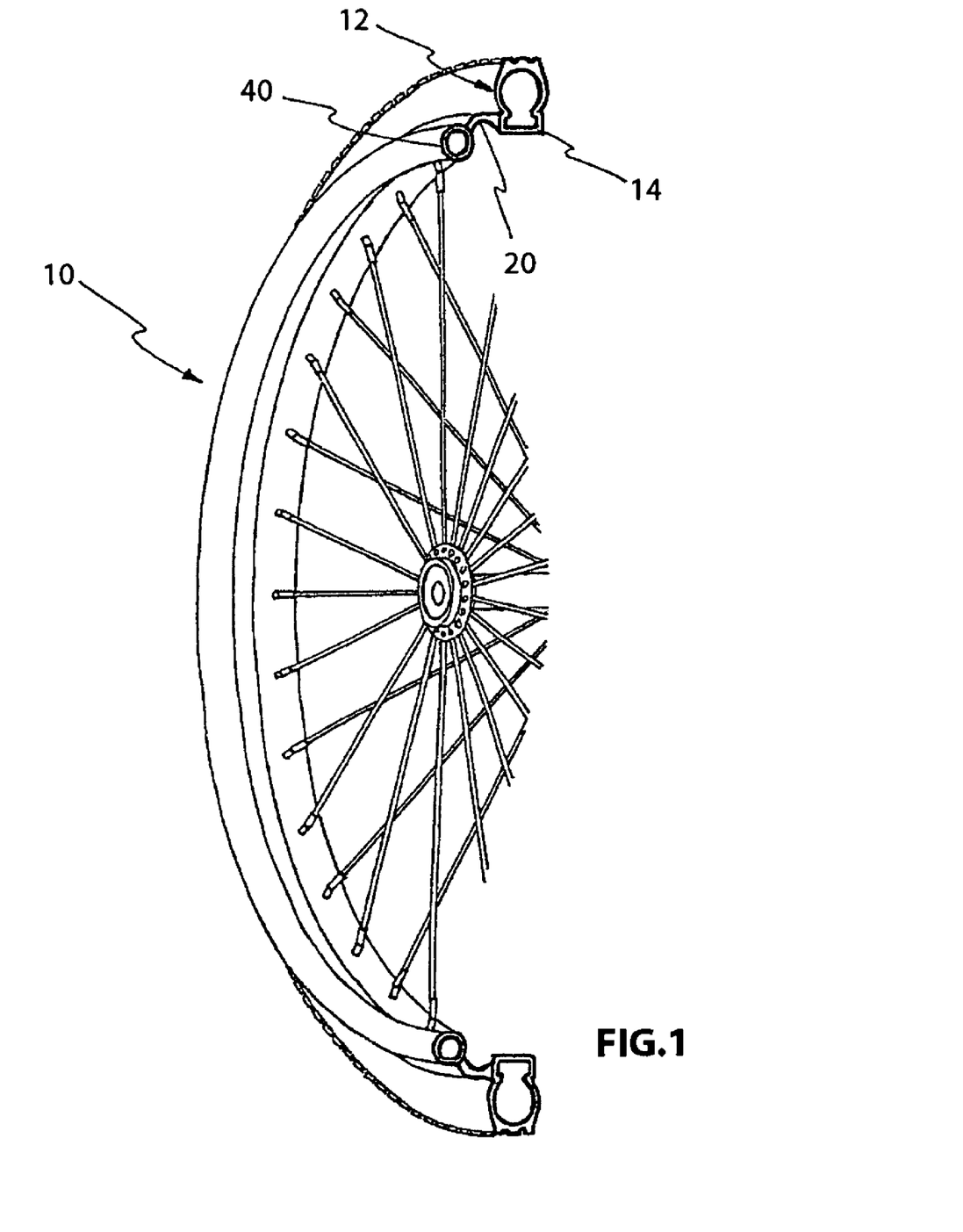
FIG. 1 is a perspective sectional view of an ergonomic wheelchair hand rim device and wheel assembly for a manual wheelchair.
Figure 2:
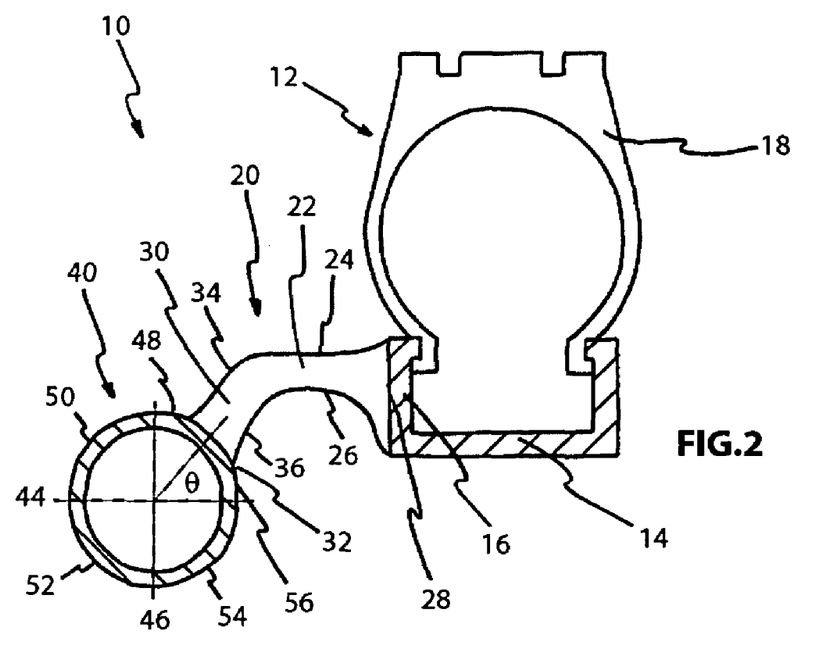
FIG. 2 is a cross-sectional view of the wheel rim, the tire, and the ergonomic wheelchair hand rim device shown in FIG. 1.
Figure 3:
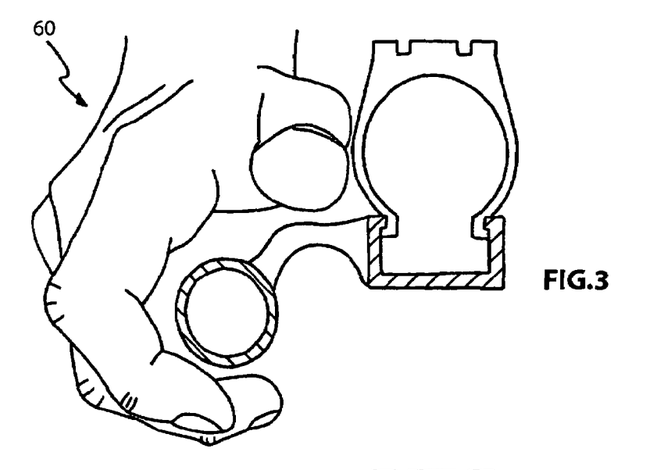
FIG. 3 is a front view of a user's hand just prior to engaging the ergonomic wheelchair hand rim device.

In its essence, and referring to the drawings, an embodiment of this invention provides an ergonomic hand rim device 10 for a manual wheelchair wheel 12 comprised of a wheel rim 14 including an outboard side 16 and having a tire 18 mounted thereon as illustrated in FIGS. 1 and 2. The ergonomic hand rim device 10 is comprised of a circular heat conducting tubular hand rim 40 and a continuous contoured elastomeric interface 20 spanning and operatively coupled between an upper inboard side or portion 32 of the circular heat conducting tubular hand rim 40 and the outboard side 16 of the wheel rim 14 as illustrated in FIGS. 1 through 13 such that when gripped by a hand of a user pushing forward the continuous contoured elastomeric interface 20 deforms to the hand of the user to cushion or attenuate impact, to improve the contoured fit to the hand for comfort, and to provide frictional coupling with the hand as illustrated in FIGS. 3 and 4.

Figure 5:
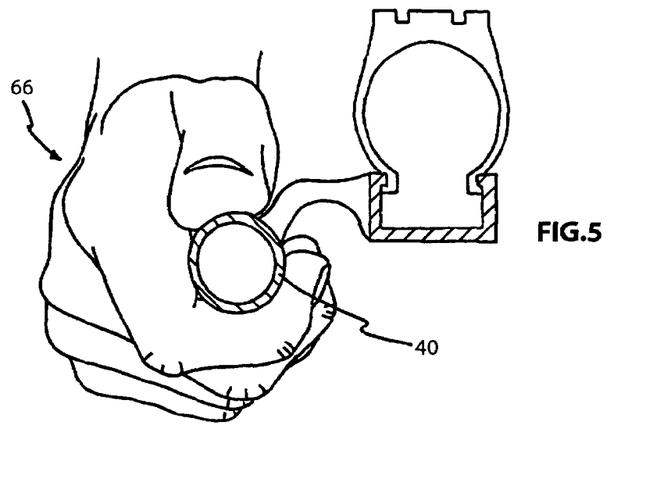
FIG. 5 is a front view of a user's hand positioned for sustained braking when using the ergonomic wheelchair hand rim device.

Additionally, and as particularly illustrated in FIG. 5, one embodiment of the an ergonomic hand rim device 10 is provided such that the user preferably only uses the circular heat conducting tubular hand rim 40 during braking wherein heat generated during braking is transferred over the entire circular heat conducting tubular hand rim such that the heat conducting tubular hand rim heats up slowly and abates heat being transferred to the hand of the user.

Figure 4:
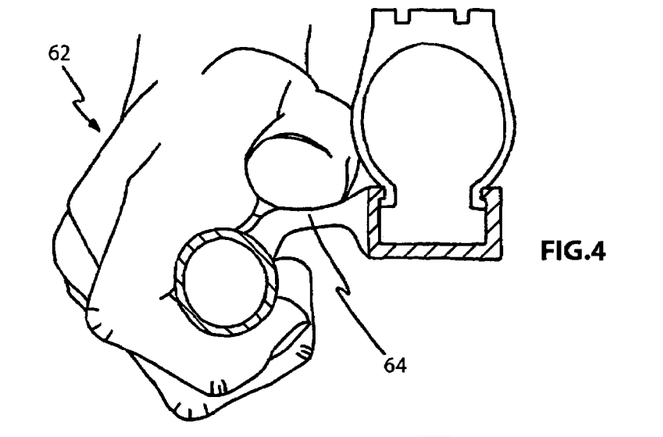
FIG. 4 is a front view of a user's hand after engaging the ergonomic wheelchair hand rim device and depicting the local deformation of the contoured elastomeric interface.
Figure 6:
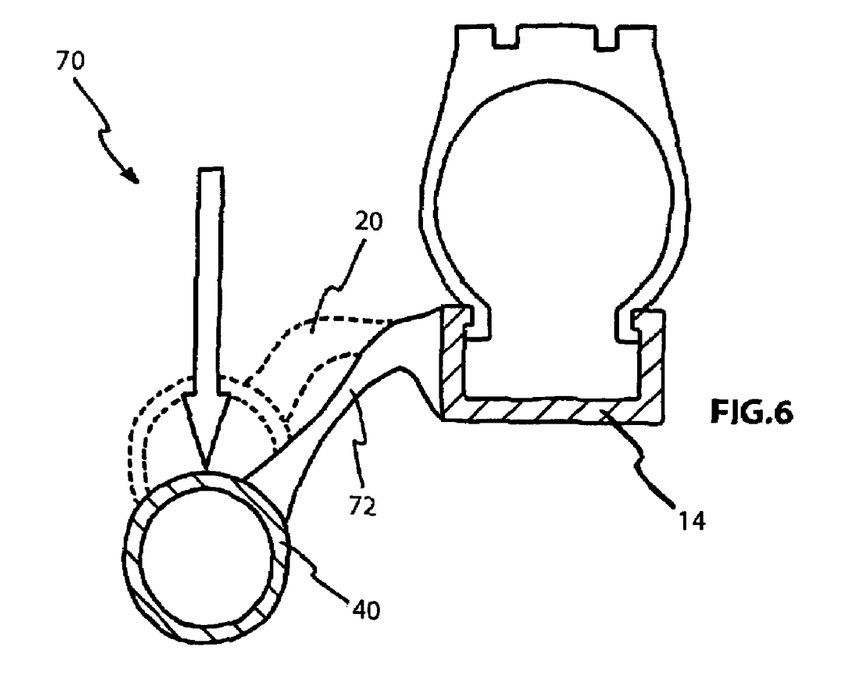
FIG. 6 is a cross-sectional view of a hand rim generally displaced from the wheel of FIG. 1 due to a downward applied force, illustrating the movement of the hand rim allowed by an elastomeric interface of the ergonomic wheelchair hand rim device.

Furthermore, and as particularly illustrated in FIGS. 4 and 6, one embodiment of the an ergonomic hand rim device 10 is comprised of the continuous contoured elastomeric interface 20 which deforms to the hand for attenuating impact loading by the local deformation of the continuous contoured elastomeric interface 64 by the hand of the user and which also provides for a general displacement of the circular heat conducting tubular hand rim 40 from the wheelchair wheel 12 as a result of an elastic deformation of the continuous contoured elastomeric interface 72.

More specifically, and referring to FIGS. 1 and 2, one embodiment of the invention provides an ergonomic hand rim device 10 for a wheelchair wheel 12, comprised of a circular heat conducting tubular hand rim 40, having a diameter less than a diameter of a wheel rim of the wheelchair wheel, and a continuous contoured elastomeric interface 20. The continuous contoured elastomeric interface 20 is comprised of a cross-sectional contour that includes an outwardly extending horizontal member 22 comprised of a concave upper surface 24 raised relative to the circular heat conducting hand rim 40 for providing a compliant initial contact surface for the hand during impact, a recessed lower surface 26 for allowing significant finger clearance during both propulsion and braking, a proximal end 28 operatively coupled to the outboard side 16 of the wheel rim 14, transitioning into and integrally formed with a downwardly depending member 30 terminating to a distal end 36 operatively coupled to the upper inboard side 32 of the heat conducting tubular hand rim 40.

The distal end 36 of the downwardly depending member 30 is operatively coupled to the inboard upper portion 32 of the tubular hand rim 40 such that distal end 36 lies in an inner and upper quadrant defined as a first quadrant of a rectangular coordinate system lying in a vertical cross-sectional plane of the circular heat conducting tubular hand rim 40 and having its origin at a center of the circular heat conducting tubular hand rim 40 wherein the origin is defined by an intersection of a horizontal axis 44 and a vertical axis 46 such that in the first quadrant the downwardly extending member is spaced at an acute angle theta ($\theta$) away from the horizontal axis and said outwardly extending horizontal member is substantially parallel with and spaced from the horizontal axis 44.

Accordingly, and still referring to FIG. 2, the majority of the circular heat conducting tubular hand rim 40 is devoid of the continuous circumferential elastomeric interface 20 defining an exposed braking surface for gripping which is comprised of a partially exposed upper inboard curved portion 48 adjacent a front side 34 of the downwardly extending member 30, an exposed upper outboard curved portion 50, an exposed lower outboard curved portion 52, an exposed lower inboard curved portion 54, and a second partially exposed upper inboard curved portion 56 adjacent a back side of the downwardly extending member 30 such that the majority of the circular heat conducting tubular hand rim 40 is exposed by being devoid of the elastomeric interface.

In one embodiment, the circular heat conducting tubular hand rim 40 is formed from an aluminum heat conducting material. One embodiment of a method for making the hand rim 40 includes the steps of providing a length of hand rim tubing which is coiled into a helix with a diameter matching the final hand rim diameter using a motor-driven three-roller coiler; cutting to create several separate hand rim hoops, welding the ends of the hoops together to form continuous hoops, grinding the weld smooth, and hard anodizing the hand rim to form a circular heat conducting tubular hand rim 40.

Additionally, in one embodiment of the invention the continuous elastomeric interface 20 characterized as being compliant to reduce impact loading and is made of a urethane polymer. Furthermore, the local compliance of the contoured elastomeric interface can be quantified by placing weight on a thumb resting on the elastomeric interface and measuring its displacement. The local displacement measured for a 40 lb load (178 N) is approximately 0.25 inch (25.4 mm). Moreover, the general compliance of the ergonomic hand rim can be quantified by hanging a weight on the tubular hand rim and measuring its displacement relative to the wheel rim. The general displacement measured for a 40 lb (178 N) load is approximately 0.1 inch (6.35 mm).

Additionally, and in one embodiment, the operative coupling of the continuous elastomeric interface 20 between the upper inboard side or portion 32 of the tubular hand rim 40 and the outboard side 16 of the wheel rim 14 is facilitated through adhesive bonding which can be achieved by overmolding urethane onto the primed metal surfaces. More specifically, an embodiment of the invention provides a method for forming an ergonomic hand rim device for providing a substantially compliant interface between a hand of a user and a wheel of a wheelchair, the steps including: 1) creating a mold positive which matches a size and shape of a tubular hand rim and a continuous elastomeric interface by, for example, a CAD model-based stereolithography (SLA) part; 2) mixing and pouring silicone around the mold positive and allowing it to cure into a solid; 3) removing the mold positive thereby leaving a cavity in the silicone matching the shape of the mold positive thereby defining a silicone mold; 4) removing the anodizing along the upper inboard portion of the tubular hand rim and the outboard side of the wheel rim by, for example, using a buffing wheel; 5) grit blasting the exposed metal to approximately an 80-grit finish; 6) degreasing the exposed metal; 7) applying a bonding primer thereto allowing the bonding primer to set; 8) inserting the tubular hand rim into the silicone mold; 9) pouring into the mold a combination of a 2-part urethane of approximately 30 Shore-A durometer until full; 10) setting the wheel rim into the urethane; 11) allowing the urethane to cure, and 12) removing the ergonomic wheelchair hand rim device from the mold.

In use and operation, and referring to FIGS. 1 through 6, an embodiment of the invention provides an ergonomic hand rim device 10 for a manual wheelchair wheel 12 having of a wheel rim 14 wherein the ergonomic hand rim device 10 is comprised of a circular heat conducting tubular hand rim 40 and a continuous contoured elastomeric interface 20 spanning and operatively coupled between an upper inboard portion of the hand rim 40 and an outboard side of the wheel rim 14 and wherein a method for use of the ergonomic hand rim device 10 is initiated by positioning ones hand above and proximate to the device 10 as illustrated in FIG. 3 and then gripping the device 10 from the prior gripping position illustrated in FIG. 3 to a pushing position as illustrated in FIG. 4 wherein the user grips both the elastomeric interface 20 and the tubular hand rim 40 such that a thumb of the hand is received within the concave upper surface 24 of the elastomeric interface 20 and such that the fingers of the hand wrap around at least the tubular hand rim 40 and potentially into the recessed lower surface of the contoured elastomeric interface 26. The contoured elastomeric interface 20 deforms to the hand of the user once gripped to cushion or attenuate impact, improve the contoured fit to the hand, and provide increased frictional coupling with the hand as shown generally at reference numeral 62 on FIG. 4. Once the pushing grip is applied as illustrated in FIG. 4, the user pushes forward on the ergonomic hand rim device 10 and the load is transferred through the elastomeric interface 20 to the wheel 12, resulting in forward propulsion. It should be noted that the continuous contoured elastomeric interface 20 prevents the thumb from becoming caught between the hand rim and the wheel rim, which if occurs during propulsion can result in serious injury.

FIG. 5 illustrates the in use and operation of the ergonomic hand rim device 10 during sustained braking. Specifically, the user preferably only uses the circular heat conducting tubular hand rim 40 during braking such that the thumb of the user engages the partial upper inboard curved portion 48 and the upper outboard curved portion 50 of the hand rim 40 which are devoid of the continuous contoured elastomeric interface and such that the fingers of the user wrap around the upper and lower outboard curved portions 50, 52, the lower inboard curved portion 54, and the second partial upper inboard curved portion 56 all devoid of the continuous contoured elastomeric interface 20 wherein heat generated during braking is transferred over the entire circular heat conducting tubular hand rim 40 such that it heats up slowly and abates heat being transferred to the hand of the user.

FIG. 6 illustrates the in use and operation of the ergonomic hand rim device 10 during loading wherein a downward force 70 provides a general displacement of the tubular hand rim 40 from the wheelchair wheel rim 14 as a result of an elastic deformation of the contoured elastomeric interface 20 such that during deformation the horizontal member 22 extends vertically downward to form a vertically downwardly extending extension 72 with said downwardly extending member for providing impact attenuation.

Thus, as illustrated in FIGS. 4 and 6, general hand rim displacement of the tubular hand rim 40 from the wheelchair wheel 12 serves to supplement the impact attenuating properties of the local deformation, generally depicted at 64, of the contoured elastomeric interface 20 by the hand during propulsion.

Figure 7:
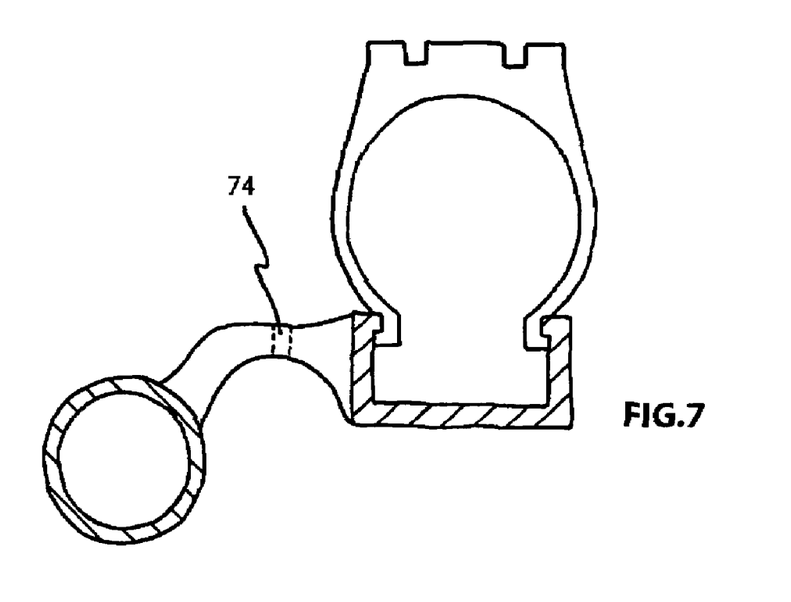
FIG. 7 is a cross-sectional view of the ergonomic wheelchair hand rim device where drain holes have been added at a location spaced around the circumference of the elastomeric interface to allow trapped water to drain out.

FIG. 7 illustrates an addition of one of a series of drain holes 74 spaced around the circumference of the elastomeric interface 20 to allow trapped water to drain out. The size and frequency of the drain holes can be tuned to optimize the drainage rate. This trapped water is a result because the contoured elastomeric interface 20 is continuous and concave when viewed from the center of the wheel and thus, forming a trough at the bottom of the wheel that can retain water from, for example, heavy rainfall or after rolling through a deep puddle.

Figure 8:
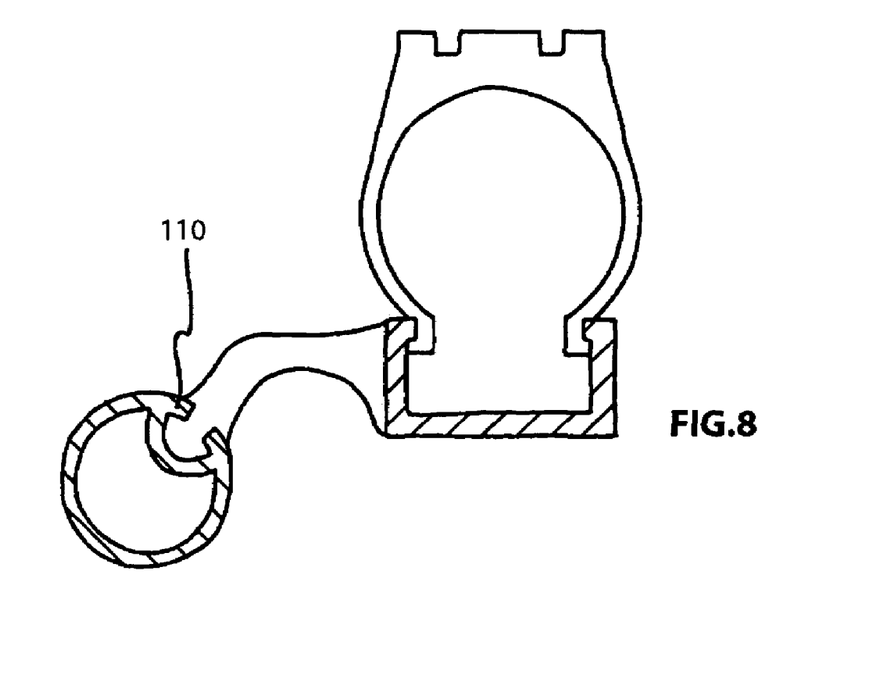
FIG. 8 is a cross-sectional view of another embodiment of FIG. 1 where the attachment mechanism of the hand rim to the elastomeric interface is altered.
Figure 9:
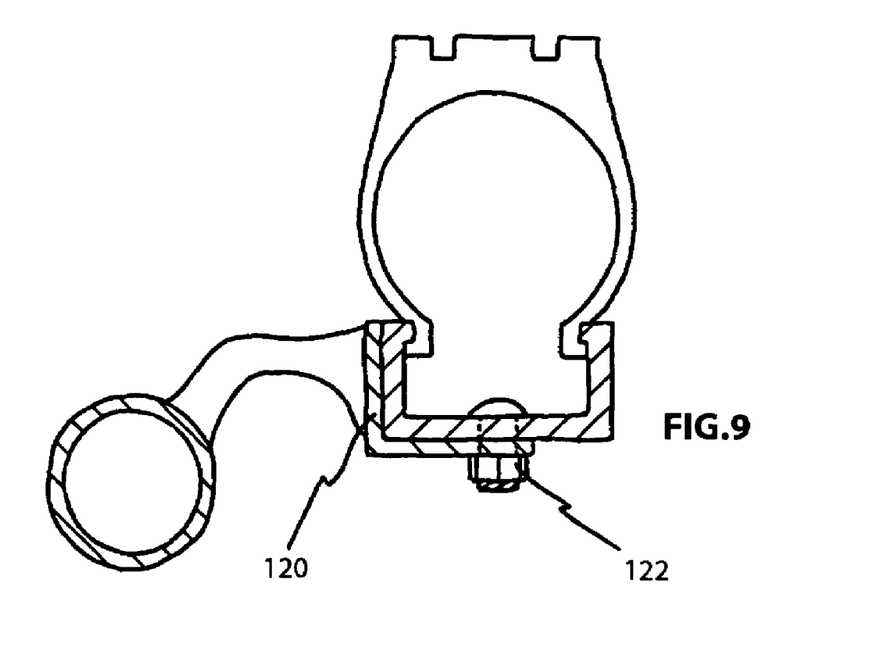
FIG. 9 is a cross-sectional view of another embodiment of FIG. 1 where the attachment mechanism of the elastomeric interface to the wheel rim is altered.

FIGS. 8 and 9 show alternative methods of bonding and assembly of the ergonomic hand rim device 10.

Particularly, FIG. 8 illustrates another embodiment of the connection between distal end 36 and the upper inboard portion 32 of the tubular hand rim 40 wherein a bulbous blind bore is formed 110. The distal end 36 is modified into a bulbous end complemental in shape to the bulbous blind bore and interlocking thereto. The bulbous blind bore or pocket serves to strengthen the joining of the two parts through a mechanical interlock rather than a chemical bond.

FIG. 9 illustrates another embodiment of the connection between the elastomeric interface 20 and the wheel rim 14. In this embodiment, the elastomeric interface 20 bonded to a secondary structural member 120 that is then attached to the wheel rim 14 by a direct fastening means 122. The secondary structural member 120 allows users to replace their current hand rims with the ergonomic hand rim device 10 without replacing their wheels.

Figure 10:
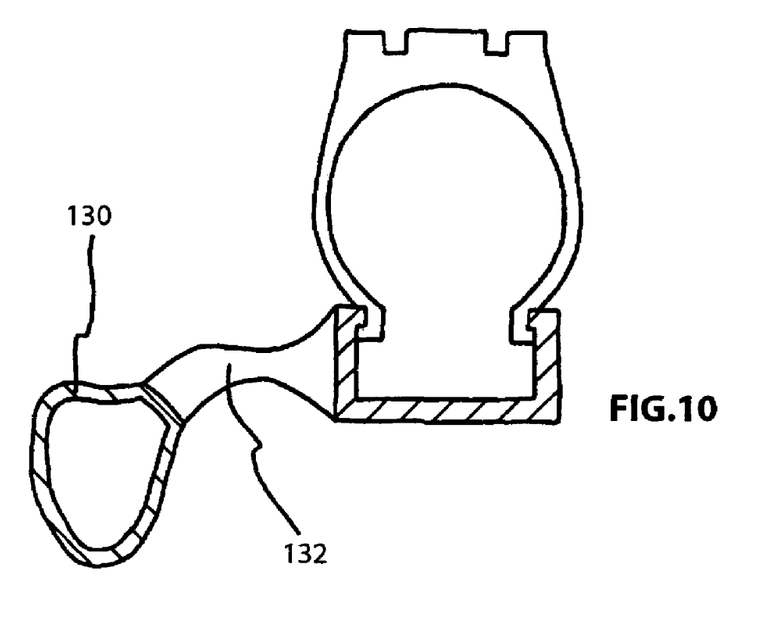
FIG. 10 is a cross-sectional view of another embodiment of FIG. 1 where the cross-sectional shape of the hand rim and the contoured elastomeric interface are altered.

FIG. 10 illustrates another embodiment of the invention wherein the cross-sectional shapes of the tubular hand rim 40 and contoured elastomeric interface 20 have been altered as shown by tubular hand rim 130 and contoured elastomeric interface 132. While the cross-sectional shape characteristics of the ergonomic hand rim illustrated in FIGS. 1 through 7 fit well within the hand, alternate shapes may be found to better match the hand, or hands of specific populations of users. In the illustrated shapes, the hand rim 130 is designed to better match the shape of the thumb during braking and the contoured elastomeric interface 132 is modified by lowering its overall height for smaller hands and reducing its thickness to maintain local deformation for smaller users.

Figure 11:
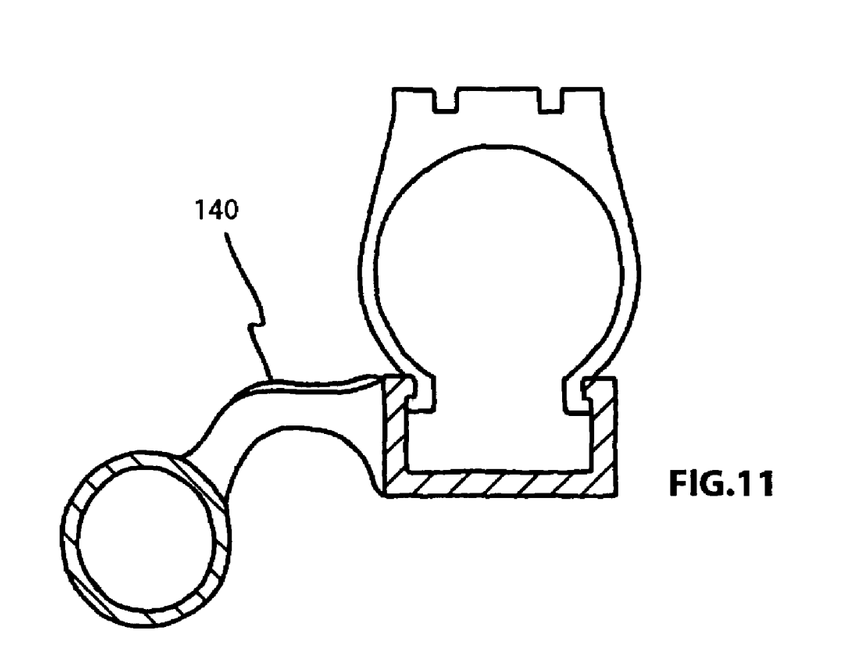
FIG. 11 is a cross-sectional view of another embodiment of FIG. 1 where surface texturing is used to enhance grip.

FIG. 11 illustrates another embodiment of the invention wherein the upper surface of the continuous contoured elastomeric interface 20 includes surface features or texture 140 added to enhance grip. While the increased frictional characteristics of the contoured elastomeric interface substantially reduce the amount the user needs to grip when pushing, it can be further reduced through enhanced surface features, such as ribs or ridges. The use of ribs or ridges enhances grip by giving the hand something to push against rather than simply gripping onto.

Figure 12:
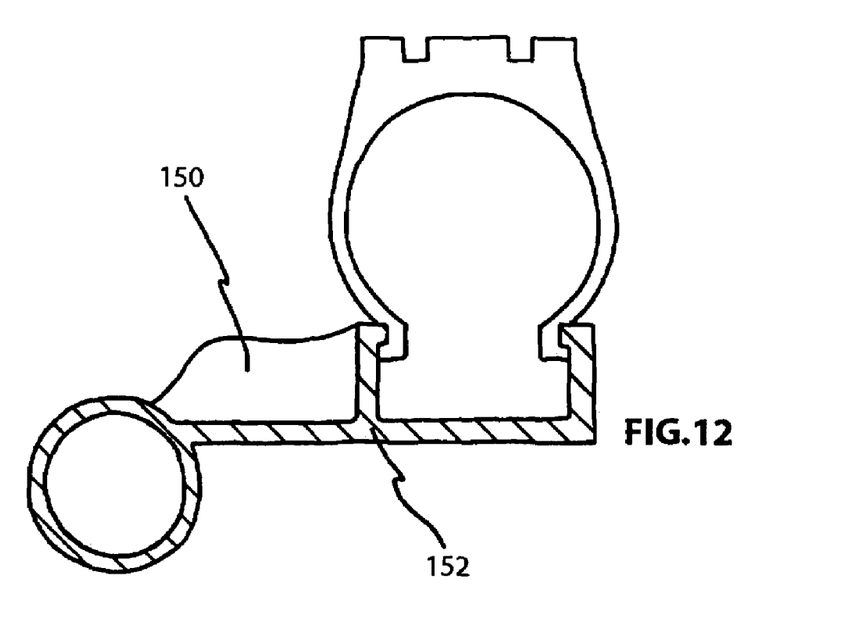
FIG. 12 is a cross-sectional view of another embodiment of FIG. 1 where the structural role of the contoured elastomeric interface is supplemented by a combined hand rim and wheel rim extrusion.

FIG. 12 illustrates another embodiment of the invention wherein the tubular hand rim is attached to the wheel rim through a rigid structural member 152 and includes a modified contoured elastomeric interface 150, modified to preserve its ergonomic benefits. In FIG. 12, the hand rim and the wheel rim are formed, bent, and joined as a single extrusion 152. The thickness of the contoured elastomeric interface is substantially increased while its hardness decreased, in order to preserve its ability to deform to fit the contour of the hand and attenuate impact loading.

Figure 13:
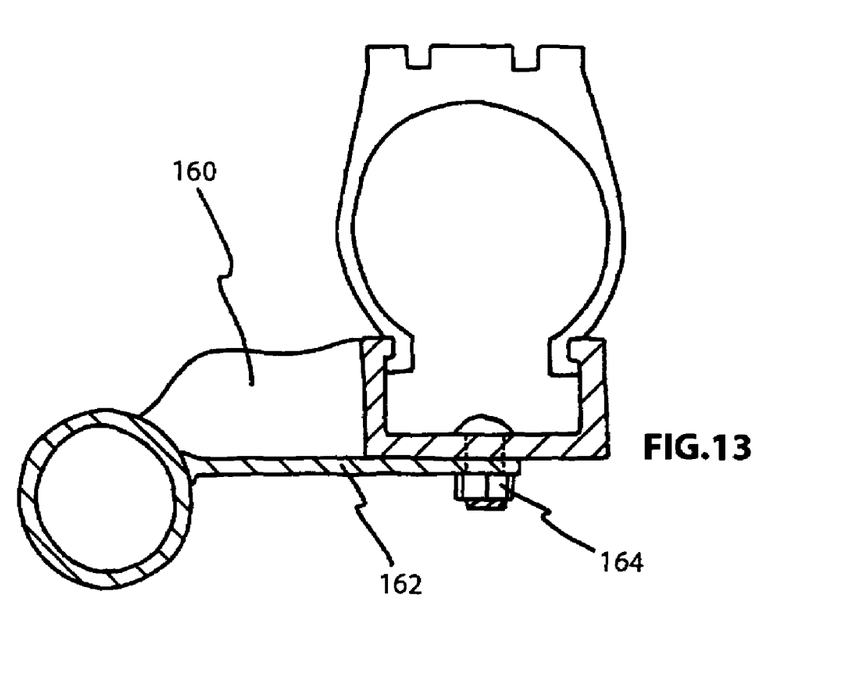
FIG. 13 is a cross-sectional view of another embodiment of FIG. 1 where the structural role of the contoured elastomeric interface is supplemented by a cylindrical hand rim projection.

FIG. 13 illustrates another embodiment of the invention wherein the hand rim is attached to the wheel rim through rigid structural members 162 and 164, and includes a modified contoured elastomeric interface 160, modified to preserve its ergonomic benefits. Again, the thickness of the contoured elastomeric interface is substantially increased while its hardness decreased, in order to preserve its ability to deform to fit the contour of the hand and attenuate impact loading. This approach allows users to replace their hand rim without replacing the entire wheel.

Accordingly, and in one aspect, the present invention provides an ergonomic hand rim device 10 for a wheelchair wheel.

In another aspect, the present invention provides the ergonomic hand rim device 10 comprised of a continuous contoured elastomeric interface 20 which generally matches the shape of the hand and further deforms to fit each specific hand shape when gripped, thereby improving comfort during use.

In another aspect, the present invention provides the ergonomic hand rim device 10 comprised of the continuous contoured elastomeric interface 20 which provides a substantially improved frictional coupling to the hand, so the user does not need to grip as hard when pushing.

In another aspect, the present invention provides the ergonomic hand rim device 10 comprised of the continuous contoured elastomeric interface 20, which reduces impact loading by a local deformation of the continuous contoured elastomeric interface 20.

In another aspect, the present invention provides the ergonomic hand rim device 10 comprised of the continuous contoured elastomeric interface 20, which reduces impact loading by a general displacement of the tubular hand rim 40 from the wheel rim 14 as a result of the elastic deformation of the continuous contoured elastomeric interface 20.

In another aspect, the present invention provides a method for using the ergonomic hand rim comprised of the step of gripping across both the tubular hand rim 40 and the continuous contoured elastomeric interface 20 when pushing the wheelchair and only gripping the tubular hand rim 40 for sustained braking of the wheelchair.

In another aspect, the present invention provides an ergonomic hand rim that replaces the discrete rigid fastener system commonly used to couple the hand rim to the wheel with a unique continuous contoured elastomeric interface.

These aspects, along with the above delineation of the device 10 including its use and operation, demonstrate the industrial applicability of this invention.

Moreover, having thus described the present invention, it should be apparent that numerous modifications and adaptations may be resorted to without departing from the scope and fair meaning of the present invention as set forth hereinabove and as described hereinbelow by the claims. The foregoing description and drawings are, accordingly, to be regarded in an illustrative rather than a restrictive sense.

We claim:

1. An ergonomic hand rim device for a wheelchair wheel, comprising in combination:
   a wheelchair wheel having a wheel rim;
   a circular heat conducting tubular hand rim having a diameter less than the wheel rim; and
   a continuous contoured elastomeric interface spanning and operatively coupled between an upper inboard portion of said circular heat conducting tubular hand rim and an outboard side of the wheel rim, said continuous contoured elastomeric interface having a cross sectional area entirely formed by an elastomeric material such that when gripped by a hand of a user said continuous contoured elastomeric interface deforms to the hand for attenuating impact loading by a local deformation of said continuous contoured elastomeric interface and for providing a contoured fit to the hand for improving comfort, and for providing frictional coupling with the hand for reducing necessary gripping pressure when pushing.

2. The combination of claim 1, wherein for sustained braking the user only uses said circular heat conducting tubular hand rim such that the thumb engages an upper curved portion of said circular heat conducting tubular hand rim devoid of said continuous contoured elastomeric interface and the fingers of the user wrap around outboard portions and a lower inboard portion devoid of said continuous contoured elastomeric interface wherein heat generated during braking is transferred over the entire circular heat conducting tubular hand rim such that said heat conducting tubular hand rim heats up slowly and abates heat being transferred to the hand of the user.

3. The combination of claim 1, wherein said continuous contoured elastomeric interface is comprised of a cross-sectional contour that includes an outwardly extending horizontal member having a generally convex shape, and a recessed lower surface and having a proximal end operatively coupled to the outboard side of the wheel rim and transitioning into and integrally formed with a downwardly depending member terminating to a distal end operatively coupled to said inboard upper portion of said circular heat conducting tubular hand rim.

4. The combination of claim 3, wherein the upper surface of said generally convex shape includes added texture to improve frictional coupling with the hand when gripping.

5. The combination of claim 1, wherein said continuous contoured elastomeric interface includes a series of drain holes radially extending through said continuous contoured elastomeric interface to allow water to drain there through.

6. The combination of claim 1, wherein said continuous contoured elastomeric interface is chemically bonded between said upper inboard portion of said heat conducting tubular hand rim and the outboard side of the wheel rim.

7. The combination of claim 1, wherein said continuous contoured elastomeric interface is operatively coupled between said upper inboard portion of said heat conducting tubular hand rim and the outboard side of the wheel rim by a mechanical joining.

8. The combination of claim 1, wherein said continuous contoured elastomeric interface is operatively coupled between said upper inboard portion of said heat conducting tubular hand rim and the outboard side of the wheel rim, wherein the tubular hand rim and the wheel rim are either structurally joined together, or formed by a single part extrusion process.

9. The combination of claim 1, wherein said contoured elastomeric interface is bonded to an intermediary structural member, which in turn is attached to the wheel rim.

10. An ergonomic hand rim device for a wheelchair wheel, comprising in combination:
   a wheelchair wheel having a wheel rim;
   a circular heat conducting tubular hand rim having a diameter less than the wheel rim;
   a continuous contoured elastomeric interface spanning and operatively coupled between an upper inboard portion of said circular heat conducting tubular hand rim and an outboard side of the wheel rim, such that when gripped by a hand of a user said continuous contoured elastomeric interface deforms to the hand for attenuating impact loading by a local deformation of said continuous contoured elastomeric interface and for providing a contoured fit to the hand for improving comfort, and for providing frictional coupling with the hand for reducing necessary gripping pressure when pushing; and
   wherein said continuous contoured elastomeric interface further includes means for providing a general displacement of said circular heat conducting tubular hand rim from the wheelchair wheel as a result of an elastic deformation of said continuous contoured elastomeric interface.

11. The combination of claim 10, wherein said means for providing the general displacement of said circular heat conducting tubular hand rim from the wheelchair wheel is provided by an elastic deformation of said continuous contoured elastomeric interface for providing impact attenuation.

12. An ergonomic hand rim device for a wheelchair wheel, said device comprising in combination:
   a circular heat conducting tubular hand rim having a diameter less than a diameter of a wheel rim of a wheelchair wheel;
   a contoured elastomeric interface comprised of a cross-sectional contour that includes an outwardly extending horizontal member having a generally convex shape, and a recessed lower surface and having a proximal end operatively coupled to an outboard side of the wheel rim and transitioning into and integrally formed with a downwardly depending member terminating to a distal end operatively coupled to an inboard upper portion of said circular heat conducting tubular hand rim such that when gripped by a hand of a user said continuous contoured elastomeric interface deforms to the hand for attenuating impact loading by a local deformation of said continuous contoured elastomeric interface; and
   wherein said contoured elastomeric interface includes means for providing a general displacement of said circular heat conducting tubular hand rim from the wheelchair wheel under an applied force as a result of a deformation of said horizontal member from a horizontal extension to a vertically downward extension of said downwardly extending member for providing impact attenuation by deformation of said continuous contoured elastomeric interface which allows a general displacement of said circular heat conducting tubular hand rim relative to the wheelchair wheel.

13. The combination of claim 12, wherein said deformation of said elastomeric interface causes said horizontal member and said downwardly extending member to be both spaced at an acute angel away from the horizontal axis for providing impact attenuation by the deformation of the elastomeric interface which allows general displacement of the heat conducting tubular hand rim relative to the wheel rim of the wheelchair.

14. An ergonomic hand rim device for a wheelchair wheel, comprising in combination:
   a wheelchair wheel having a wheel rim;
   a circular heat conducting tubular hand rim having a diameter less than the wheel rim; and
   a continuous contoured elastomeric interface operatively coupled between said circular heat conducting tubular hand rim and said wheel rim for providing impact attenuation by allowing a displacement of said circular heat conducting tubular hand rim relative to said wheel rim as a result of a deformation of said continuous contoured elastomeric interface.

* * * * *